Oct. 15, 1963

S. R. SMITH ETAL 3,106,970

IMPLEMENT MOUNTING APPARATUS

Filed Sept. 8, 1960

STEVE R. SMITH
SAM H. SMITH
INVENTORS
HUEBNER & WORREL
ATTORNEYS

BY Richard M. Worrel

Oct. 15, 1963  S. R. SMITH ETAL  3,106,970
IMPLEMENT MOUNTING APPARATUS
Filed Sept. 8, 1960  2 Sheets-Sheet 2
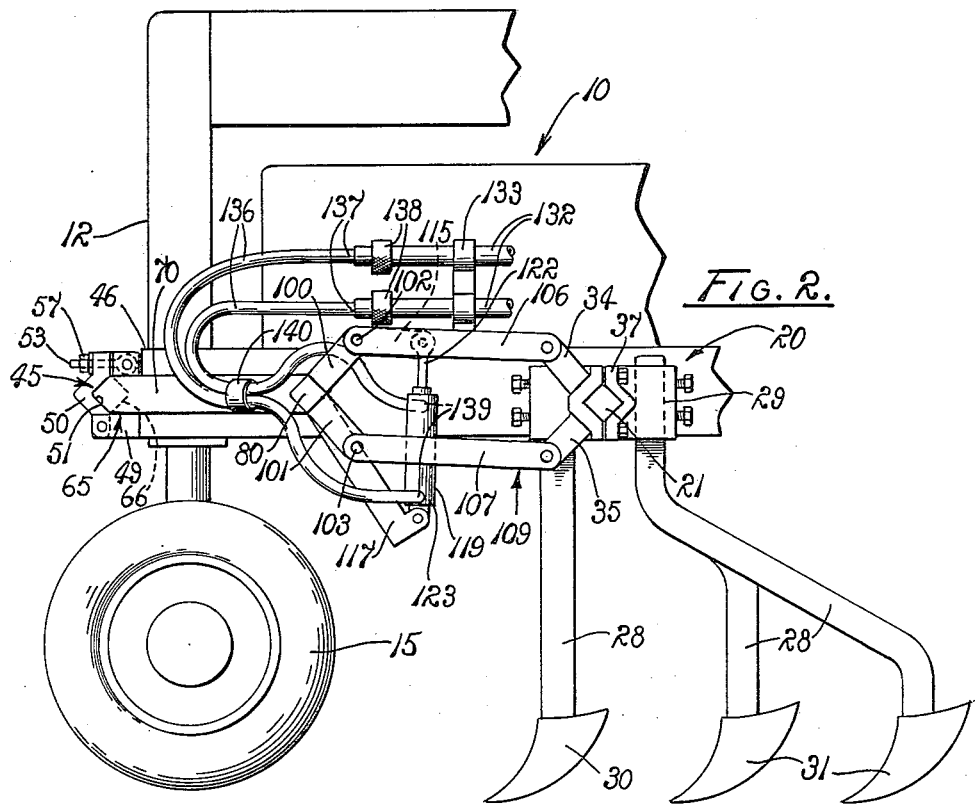
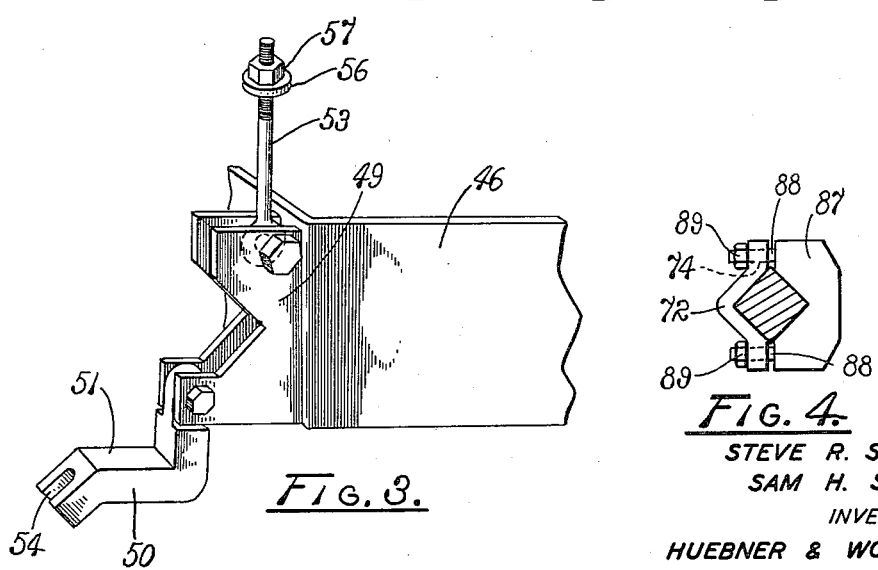
STEVE R. SMITH
SAM H. SMITH
INVENTORS
HUEBNER & WORREL
ATTORNEYS

United States Patent Office 3,106,970
Patented Oct. 15, 1963

3,106,970
IMPLEMENT MOUNTING APPARATUS
Steve R. Smith and Sam H. Smith, both of
P.O. Box 85, Summerfield, Tex.
Filed Sept. 8, 1960, Ser. No. 54,718
3 Claims. (Cl. 172—273)

The present invention relates to an implement mounting apparatus and, more particularly, to such an apparatus which facilitates connection and disconnection of an implement to and from a support vehicle, and which mounts the implement on the vehicle for movement between working and transporting positions.

Agricultural implements are conventionally mounted on the forward or rearward end portions of a tractor by hitches, or coupling devices, of various kinds. Irrespective of the implement to be mounted, the mounting position thereof, or the type of hitch, it is desirable that connection and disconnection be as simple and as quick as possible, and be performed with a minimum of labor. It is also important that the mounting device provide a dependable, and ordinarily elevationally adjustable, support for the implement.

In the past, these desirable objectives have not always been satisfactorily achieved. If the implement does not have adquate stability for self-support and is therefore easily upset during connection, or if the implement is subject to imbalance during disconnection so as to impart undue strain on the coupling members, connection and disconnection is difficult especially for a single workman. Of course, many implements have their own support vehicles, or by nature of their earth engaging tools are self-supporting and thereby provide the desired stability. However, support vehicles incorporated as a part of an implement may add unnecessary weight and expense to the implement or may interfere with positioning of the implement during operation. Still other implements are fulcrumed about support wheels and provide forwardly extended tongues which rest on the ground when the implement is uncoupled, and which must be lifted into coupling position or lowered during disconnection.

Implements which lack the described stability include those which are intended to cover a wide swath during operation and therefore ordinarily have a relatively long transverse dimension as compared to their longitudinal dimension. An example of such an implement is an elongated tool bar mounting a plurality of cultivating tools in spaced relation along the bar. While such an implement may stand by itself, it may easily be tipped forwardly or rearwardly while effort is being made to connect it to a tractor. Further, the length of such an implement when mounted in a work position on a tractor normally precludes travel on most highways, or the like.

Accordingly, it is an object of the present invention to provide an implement mounting apparatus which facilitates connection and disconnection of an implement to and from a support vehicle, such as a tractor.

Another object is to enable such connection and disconnection of implements which are subject to tipping, tilting, upset, or imbalance, during connection and disconnection.

Another object is to facilitate the connection of a wide swath type of implement to a draft vehicle wherein the implement has a relatively long transverse dimension as compared to its longitudinal dimension and is, therefore, relatively easily tipped forwardly or rearwardly during connection or disconnection.

Another object is to provide an apparatus for elevationally adjustably mounting an implement on the forward end portion of a tractor.

Another object is to mount a wide swath implement on a draft vehicle so that the implement can be moved between a work position wherein the implement is adapted to cover such a wide swath and a transporting position wherein the overall width of the vehicle and the implement is reduced.

Another object is to facilitate the elevational alignment of a pair of coupling members respectively mounted on a tractor and an implement adapted for connection to the tractor.

Another object is to facilitate the movement of a tractor into and out of coupling position with respect to an implement.

Other objects are to provide a mounting apparatus which is economical to construct, durable in construction, dependable in action, and adaptable for connecting a variety of implements to various support vehicles.

These, together with other objects, will become more fully apparent upon reference to the following description and accompanying drawings.

In the drawings:

FIG. 1 is a plan view of an implement mounting apparatus embodying the principles of the present invention and shown mounting a pair of implements on a tractor with the implement on the right side of the tractor begin shown in work position, with the implement on the left side of the tractor being shown in coupling position in full line, and with said latter implement being shown in work position in dashed lines.

FIG. 2 is a somewhat enlarged, fragmentary, side elevation of the tractor, implement, and mounting apparatus of FIG. 1 with the implement being shown in work position.

FIG. 3 is a still further enlarged, fragmentary perspective view of a portion of a tractor coupling member incorporated in the mounting apparatus of the present invention.

FIG. 4 is a transverse section taken on line 4—4 in FIG. 1.

Figure 1:
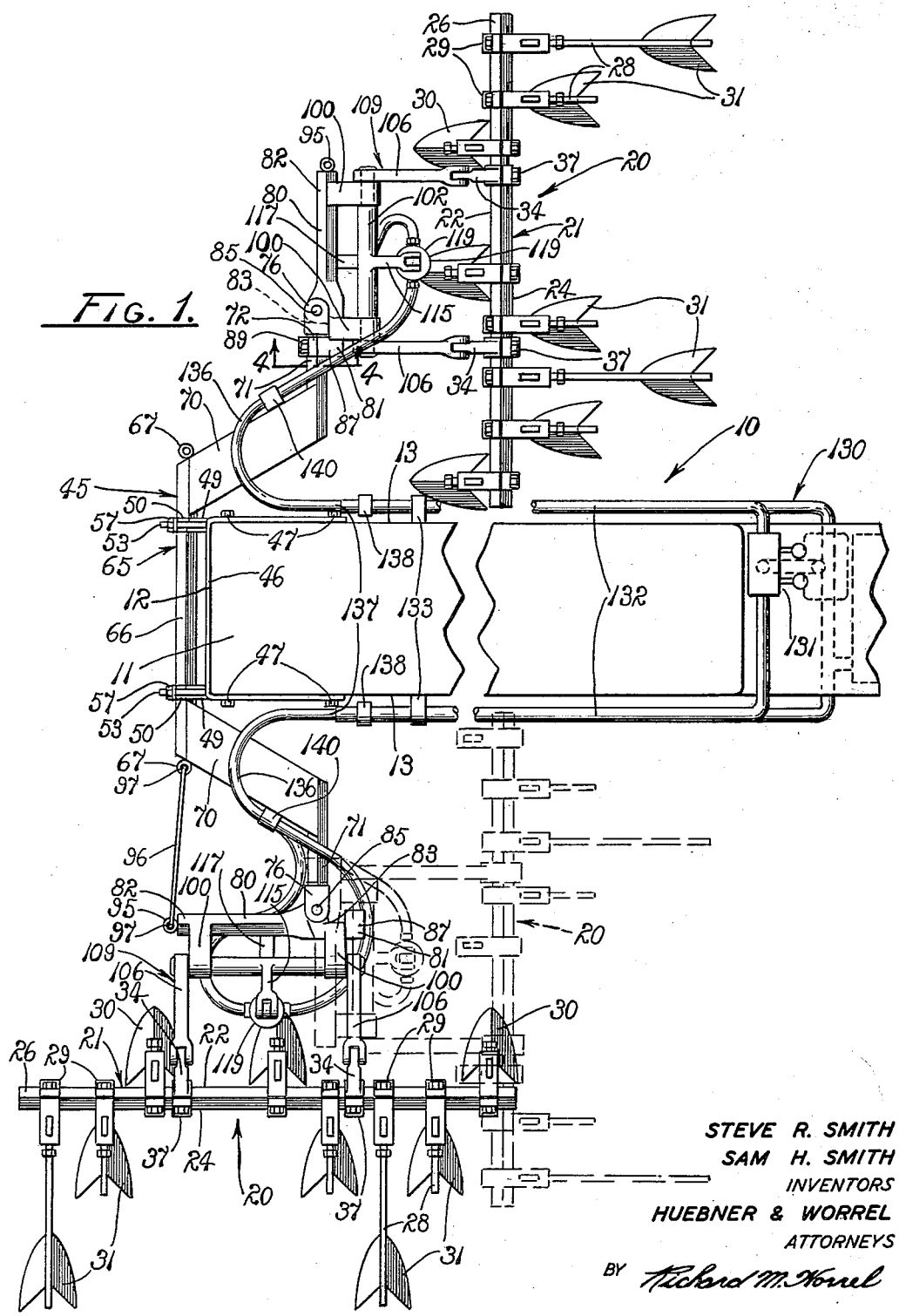

Referring more particularly to the drawings, a tractor is partially illustrated in FIGS. 1 and 2 and is identified by the numeral 10. The tractor has a forward end portion 11 providing a front face 12 and opposite left and right sides 13 with respect to the forward direction of tread of the tractor. A forward ground wheel 15 supports the forward end portion of the tractor for earth traversing movement.

The implements to be mounted on the tractor 10 are identified by the numeral 20. The implements are identical and only one is described in detail although common reference numerals identify common parts thereof. Thus, each implement has an elongated tool bar 21 having a square cross-section, a forward portion 22, a rearward portion 24, and opposite ends 26. Elongated shanks 28 are longitudinally adjustably mounted on the tool bar by means of clamps 29 and extend downwardly both forwardly and rearwardly from the tool bar. Forward and rearward earthworking tools 30 and 31, respectively, are secured to the shanks in downwardly spaced relation to the tool bar. The tools are spaced longitudinally of the bar as well as transversely thereof.

As best seen in FIG. 2, inner and outer, upper and lower pairs of rear mounting arms 34 and 35 are also longitudinally adjustably connected in longitudinally spaced relation to each other on the tool bar by means of clamps 37. The upper and lower arms in each pair extend generally forwardly of the tool bar 21. It is to be noted that each of the implements 20 is self-supporting when the forward and rearward tools 30 and 31 are in ground engagement. This self-support is possible because there are at least three tools 30 in triangular relation to each. This provides three points of support at least one of which is on the opposite side of the tool bar from the other two. Of course, as shown in the illustrated embodiment of the implement, the larger number of tools provided both forwardly and rearwardly of the tool bar gives greater support to the implement than a minimum of three would. Nevertheless, it is evident that the implement is relatively easily transversely upset especially if force is applied to the tool bar in a horizontal plane and normally against the rearward portion 24 thereof. Conversely, it is evident that the implement has considerably more longitudinal stability, that is, ability to upset incident to application of force axially against an end 26 of the tool bar 21. Otherwise stated, the implement can be tipped forwardly or rearwardly much more easily than it can be tipped from end-to-end. This characteristic of instability in the direction of travel of the implement is of importance in the present invention, and the manner in which it is counteracted by the subject invention is described hereinafter.

An implement mounting apparatus, embodying the principles of the present invention, is generally identified by the numeral 45 in FIG. 1. This apparatus has a U-shaped tractor coupling frame 46 fitted around the forward end portion 11 of the tractor 10 against the front face 12 and opposite sides 13. Bolts 47 secure the frame rigidly to the tractor. A pair of relatively stationary, bifurcated, identical female coupling jaws 49 are borne by the frame; one of these jaws is best illustrated in FIG. 3. This jaw is rigidly secured to and forwardly extended from the portion of the coupling frame which overlays the front face 12 of the tractor. A relatively movable female coupling jaw 50 is pivotally connected to each stationary jaw for movement between a coupling position, as illustrated in FIGS. 1 and 2, and a retracted or open position, as illustrated in FIG. 3. When the jaws are in coupling position, they form a substantially square opening 51. An elongated bolt 53 is pivotally connected to the stationary jaw and has a threaded end receivable in a notch 54 in the movable jaw when the latter is in coupling position. A washer 56 circumscribes the bolt, and a nut 57 is screw-threadably connected to the bolt for holding the movable jaw in its coupling position. The pair of stationary and movable jaws are mounted on the frame so that the openings 51 therein are in horizontal alignment transversely of the tractor.

A generally U-shaped implement mounting frame 65 includes an intermediate, male coupling bar 66 of square cross-section corresponding in size to the opening 51, and longer than the width of the forward end portion 11 of the tractor 10. This coupling bar is fitted into the stationary jaws 49 with the jaws open, thereafter releasably received in the openings 51 of the jaws 49 and 50 by closing the jaws into coupling positions, subsequently secured to the tractor coupling frame 46 and the tractor by tightening of the nuts 57. In this position, the coupling bar is substantially horizontal and its opposite end portions extend laterally outwardly from opposite sides 13 of the tractor. It is to be noted that eyelets 67 are secured to opposite ends of the bar for a purpose to be described.

The implement mounting frame 65 also includes elongated side wing plates 70 rigidly secured to opposite end portions of the coupling bar 66 and extended rearwardly outwardly therefrom in laterally spaced relation to the tractor. Also, outer mounting bars 71 are laterally outwardly extended from the plates in substantially parallel, rearwardly spaced relation to the male coupling bar and preferably in coaxial alignment transversely of the path of travel of the tractor 10. Upright clamping flanges 72 are secured, as by welding, to the forwardly disposed surfaces of the outer bars and provide apertures 74 above and below the outer bars. Bifurcated pivot brackets 76 are individually secured to the outer mounting bars and extend laterally outwardly therefrom.

Elongated mounting rods 80 provide inner and outer end portions 81 and 82, respectively, and intermediate, laterally extended, relatively flattened tongues 83. The tongues are individually received in the pivot brackets 76 and connected thereto by upright pins 85. The mounting rods are thus supported for horizontal pivoting movement around said pins as axes between work positions in generally coaxial alignment with the outer mounting bars 71 and therefore substantially normal to the path of travel of the tractor 10, and coupling positions substantially parallel to the path of travel of the tractor and therefore generally normal to the outer mounting bars. The inner end portions of the mounting rods overlap the mounting bars in said work positions and thereby limit rearward swinging of the mounting rods on the pivot pins to the described generally coaxial relationship. Bifurcated clamping brackets 87 are rigidly secured to the inner end portions of the rods and mate with corresponding clamping flanges 72. Bolts 88 are projected from the clamping brackets and extend through the apertures 74 in said work positions. Nuts 89 are screw-threadably turned on the ends of the bolts and tightened against the clamping flanges for holding the mounting rods in their work positions.

Eyelets 95 are also secured to the outer end portions 82 of the mounting rods 80. When the mounting rods are in their coupling positions, as described above, the eyelets 95 are generally transversely opposite to the eyelets 67 on their respective sides of the mounting apparatus 45. Longitudinally rigid and non-extensible tie members 96 have opposite hook ends 97 respectively releasably connected to the eyelets for holding the mounting rods in coupling positions, as illustrated on the left side of the tractor 10 in FIG. 1.

With reference to FIGS. 1 and 2, inner and outer pairs of upper and lower, front mounting arms 100 and 101 are rigidly rearwardly extended from the inner and outer end portions 81 and 82, respectively of the mounting rods 80. Upper and lower rock shafts 102 and 103 are respectively journaled in the upper and lower, front mounting arms in rearwardly spaced substantially parallel relation to the mounting rod although above and below the same. Inner and outer pairs of upper and lower, substantially parallel, rigid links 106 and 107 respectively pivotally interconnect corresponding upper and lower, front and rear mounting arms 100, 101, 34 and 35. As can be seen in FIGS. 1 and 2, the upper links 106 of both the inner and outer pairs are non-rotatably fixed to the upper rock shaft 102. The front and rear mounting arms respectively rigidly interconnected by the mounting rods 80 and the implement tool bars 21 and pivotally interconnected by the links constitute parallelogram mounting frames, generally indicated by the numeral 109. These parallelogram frames elevationally adjustably support their corresponding implements 20 on the mounting rods with the tool bars substantially parallel to the mounting rods irrespective of the elevationally adjusted position of the implements relative to their respective mounting rods.

Upper levers 115 are rigidly, rearwardly, radially, outwardly extended from the upper rock shafts 102 between the inner and outer pairs of links 106 and 107. Ram support braces 117 are rigidly, rearwardly downwardly extended from the mounting rods 80 between the links and in generally common planes with their corresponding levers, as best seen in FIG. 1. Hydraulic rams 119 provide upper and lower ends 122 and 123 respectively pivotally connected to the levers and to the support braces on opposite sides of the mounting apparatus 45. The rams are expansible and contractible for elevationally controlling their respective parallelogram frames 109 and thus the implements 20. Therefore, when the rams are expanded, the levers 115 rotate the rock shafts 102 in a counterclockwise direction, as viewed in FIG. 2, to raise the implements relative to the mounting rods 80. When the rams are contracted, the upper rock shafts are allowed to rotate in a clockwise direction under gravitational urgence of the implements whereby the latter are lowered toward or into ground engagement.

A hydraulic system 130 is mounted on the tractor 10 and includes a control mechanism generally indicated by the numeral 131. Conduits 132 are connected to the control mechanism and extended forwardly along opposite sides 13 of the tractor being supported thereagainst by brackets 133. Flexible hoses 136 provide ends 137 releasably connected to the conduits by quick disconnect couplings 138 and outer ends 139 individually connected to the rams 119. Preferably, straps 140 secure the hoses to their respective side plates 70 of the implement mounting frame 65. Thus, by operation of the control mechanism, fluid is fed to or bled from the rams through the conduits and hoses for expanding and contracting the rams.

*Operation*

The operation of the described embodiment of the subject invention is believed to be readily apparent and is briefly summarized at this point.

With the implements 20 mounted on the tractor 10 by the subject apparatus 45, and latched in their work positions, as illustrated in full lines on the right side of the tractor and in dashed lines on the left side of the tractor in FIG. 1, the implements are ready for use in cultivating. Of course, the implements are lowered by operation of the hydraulic system 130 so that the tools 30 and 31 are in earthworking engagement.

In order to disconnect the implements 20 from the tractor 10, the tractor is stopped and the implements are elevated by expansion of the rams 119 and upward skewing of the parallelogram frames 109. The nuts 89 are removed to disconnect the clamping flanges 72 and the brackets 87. The implements are then swung horizontally about the pins 85 into coupling positions, as illustrated in full lines on the left side of the tractor 10 in FIG. 1. The tie members 96 releasably latch or hold the implements in said coupling positions. The rams 119 are then contracted to allow the implements to descend and the tools 30 and 31 thereof to move into ground engagement. The nuts 57 are removed and the jaws 49 and 50 opened to release the male coupling bar 66 from the jaws. While so doing, the hydraulic system 130 is operated to raise or lower the mounting rods 80, and thus the implement mounting frame 65 including the male coupling bar relative to the implements. Movement of the mounting rods 80 and the frame 65 is caused by the reaction force of the hydraulic rams 119 exerted against the ram support braces 117 in attempting to move levers 115 to transmit forces in either an upward or downward direction to the ground engaging tools through the rock shafts 102 and parallelogram linkages 109. Since the rigid connection of the coupling bar 66 to the front face of the tractor has been disassembled, this reaction force cannot be transmitted to the tractor; consequently vertical movement of the mounting frame results from extension and retraction of the rams 119. It is evident that this reduces vertical strain imposed on the coupling bar and jaws and facilitates disconnection. The hoses 136 are disconnected from the conduits 132, and the tractor 10 is backed away from the coupling bar and out from between the implements.

The implements 20 joined by the subject mounting apparatus 45 and oriented in their coupling positions readily stand erect without support of the tractor 10. With both of the implements in their coupling positions, the tool bars 21 are in opposed, spaced, parallel relation. Of course, the implements are conveniently stored in this manner. When it is desired to connect the implements to the tractor, the forward end portion 11 thereof is driven between the implements and into the implement mounting frame 65 so that the jaws 49 and 50 are adjacent to the male coupling bar 66. The hoses 136 are connected to conduits 132 by the couplings 138. The coupling bar is then elevationally adjusted into precise horizontal alignment with the jaws by expansion or contraction of the rams 119, as will be evident. The implements dependably maintain the coupling bar in this horizontal position of alignment. Further, because the implements are substantially parallel to the path of travel of the tractor, the implements resist upset when the forward end portion of the tractor engages the coupling bar during connection. Thus, no effort is required to hold the coupling bar up into a position of alignment incident to forward or rearward tipping of the implements. Thus, advantage is taken of the considerable stability of the implements longitudinally of their tool bars 21 as opposed to their relative instability transversely of their tool bars, all as described above.

After the coupling bar 66 is connected to the jaws 49 and 50, the implements 20 are elevated, and the tie members 96 are removed. The weight of the implements is now imposed on the tractor 10. The implements are then manually swung rearwardly into their work positions where they are secured by connection of the clamping brackets and flanges 87 and 72. Thus, the implements are once again mounted for earth traversing movement over the ground and for cultivating the soil.

Still further, the subject mounting apparatus 45 provides for convenient transportation of the implements 20. For this purpose, the implements are swung into their coupling positions and latched therein by connection of the tie member 96. The implements are then elevated so that the tool bars 21 are in substantially vertical alignment with the upper rock shafts 102. By removal of the tools 30 and 31 and their respective shanks 28, or at least by removal of the most rearwardly extended tools 31, it is evident that the overall width of the tractor 10 and implements 20 is considerably less than such overall width when the implements are in their work positions.

From the foregoing, it will be evident that an implement mounting apparatus has been provided which facilitates connection and disconnection of an implement to and from a tractor, or other support vehicle during connection and disconnection so that considerable stability is imparted to the implements and the coupling members during the connecting or disconnecting operations. In addition, the apparatus provides for elevational adjustment of the implements relative to the support vehicle or of the supporting apparatus relative to the implements so as to enable the coupling members to be brought into precise alignment during connection and to relieve the coupling members of strain during disconnection. The subject apparatus also facilitates the transport of implements when not in working use by orienting the implements on the support vehicle so that the total width is less than the width when the implements are in work positions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In an apparatus adapted to mount an implement on a draft vehicle for earth traversing movement along a predetermined forward path of travel; a forward coupling bar adapted to be horizontally supported on such a vehicle in transverse relation to said path of travel; a side member rigidly rearwardly extended from the bar; a mounting rod supported on the side member for horizontal swinging movement about an upright axis substantially normal to the bar, said rod being swingable between a work position in rearwardly spaced, substantially parallel relation to the bar and a position angularly displaced from the work position and in oblique angular relation to the bar; means releasably alternately interconnecting the rod and the side member on opposite sides of said pivot axis in said work and displaced positions for selectively holding the rod in said displaced position; an elevationally skewable, parallelogram frame borne by the rod and adapted to support an implement thereon; and powered means interconnecting the skewable frame and the rod for elevationally skewing the frame.

2. The apparatus of claim 1 including a coupling frame adapted to be connected to the vehicle and including spaced clamps in horizontal alignment transversely of said path when connected to such vehicle, and wherein the coupling bar is releasably held in the clamps.

3. The apparatus of claim 1 wherein the side member includes a mounting bar rigidly outwardly extended in rearwardly spaced relation to the coupling bar and pivotally supporting said rod, wherein the rod has an inner end overlapping said mounting bar in the work position of the rod and an opposite outer end, and wherein said interconnecting means includes a clamp releasably connecting the inner end of the rod to said mounting bar on the opposite side of said axis from the outer end of the mounting bar.

4. The apparatus of claim 1 wherein the rod has an inner end adjacent to said axes and an opposite outer end; and wherein said interconnecting means includes eyelets respectively connected to the coupling bar and to the outer end of the rod, and a tie member releasably hooked to the eyelets in said displaced position.

5. In combination with an elongated implement, an apparatus for mounting the implement in outward extension from a side of a vehicle comprising a vehicle coupling member adapted to be rigidly connected to such a vehicle, an elongated implement coupling member releasably connected to the vehicle coupling member and adapted to extend laterally outwardly from a side of such a vehicle, an elongated mounting rod having inner and outer ends, an elevationally adjustable parallelogram frame pivotally interconnecting the rod and the implement for relative elevational adjustment of the implement and the rod, means pivotally connecting the inner end of the rod to the implement coupling member for horizontal swinging movement of the implement about a substantially upright axis between an inner work position in rearwardly spaced, substantially parallel relation to the implement coupling member and an outer coupling position in substantially normal relation to the implement coupling member, said parallelogram frame being elevationally adjustable in the coupling position of the implement for raising and lowering the implement coupling member into coupling relation with the vehicle coupling member, and powered means interconnecting the frame member and the rod for elevationally adjusting the frame.

6. In combination with a tractor having a forward end portion and opposite sides and being mounted for earth traversing movement in a predetermined line of travel; a substantially U-shaped coupling frame having a central coupling portion releasably connected to the forward end portion of the tractor and a pair of wing portions; a pair of elongated mounting rods pivotally supported on the wing portions for horizontal swinging movement about upright axes between coupling positions extended forwardly from their respective axes and work positions extended laterally outwardly from said axes with respect to said line of travel; spaced, inner and outer pairs of upper and lower arms rigidly extended, respectively upwardly and downwardly from the rods; upper and lower rock shafts journaled in the upper and lower arms associated with each mounting rod and in substantially parallel relation thereto; elongated tool bars; a plurality of earthworking tools borne by each bar and downwardly extended therefrom; spaced inner and outer pairs of upper and lower arms rigidly extended respectively upwardly and downwardly from the bars; inner and outer pairs of elevationally spaced, substantially parallel, upper and lower links respectively pivotally interconnecting corresponding upper and lower arms on the rock shafts and upper and lower arms of the tool bars on opposite sides of the tractor for independent elevational adjustable movement of the tool bars between lower earthworking positions with the tools adapted for earth engagement and upper transporting positions with said tools out of earth engagement; levers rigidly radially extended from the rock shafts; braces rigidly downwardly extended from the mounting rods; and fluid control rams pivotally interconnecting the braces and the levers on opposite sides of the tractor for moving the tool bars between upper and lower positions, the tool bars and tools being movable with their respective mounting rods between work positions, laterally outwardly extended from the tractor in substantially normal relation to the line of travel of the tractor, and coupling positions in laterally outwardly spaced, substantially parallel relation to said line of travel, the coupling frame being independently supportable on said tools upon movement of the tool bars into coupling positions, upon movement of the tools into earthworking positions, and upon release of the coupling frame from the tractor.

7. In an apparatus adapted to mount laterally opposed implements on a draft vehicle for earth traversing movement along a predetermined forward path of travel; a forward coupling bar adapted to be horizontally supported on such a vehicle in transverse relation to said path of travel; opposed side members rigidly rearwardly extended from each end of the bar on opposite sides of the vehicle; a respective mounting rod supported on each side member for horizontal swinging movement about an upright axis substantially normal to the bar, each of said rods being swingable between a work position in rearwardly spaced substantially parallel relation to its respective bar and a position angularly displaced from the work position and in oblique angular relation to said respective bar; a respective elevationally adjustable support frame borne by each of the rods, each frame being adapted to support a respective implement thereon in selective positions of elevation while maintaining a predetermined implement attitude; and individual powered means interconnecting each support frame and its respective mounting rod for elevationally positioning each of the implements when the apparatus is mounted on the draft vehicle and for elevationally positioning the forward coupling bar when the apparatus is dismounted from the draft vehicle and standing independently by means of the implements.

8. An apparatus, for mounting a pair of laterally opposed implements on opposite sides of a draft vehicle having a source of power thereon, comprising a vehicle coupling member connected to the vehicle; an implement coupling member releasably connected to said vehicle coupling member and affording opposite lateral extension portions extending laterally from the vehicle a predetermined distance; a pair of mounting rods, each having a respective inner end pivotally connected to said coupling member for pivotal movement about a respective substantially vertical axis; a pair of implement support frames each being pivotally mounted on a respective one of the rods for movement in a vertical plane about a respective horizontal axis; means connecting each of the implements with a respective one of the frames to maintain a predetermined attitude of the implements during selective elevation thereof; power means pivotally interconnecting each of the frames with a respective one of the rods; and means connecting said powered means to said source of power on the vehicle to effect selective elevational movement of the implements when mounted on the draft vehicle and to effect selective elevational movement of the implement coupling member when dismounted from the draft vehicle.

References Cited in the file of this patent
UNITED STATES PATENTS

| | | |
|---|---|---|
| 2,172,971 | Graham | Sept. 12, 1939 |
| 2,401,183 | Pool et al. | May 28, 1946 |
| 2,423,148 | Johnson | July 1, 1947 |
| 2,687,074 | Tanke et al. | Aug. 24, 1954 |
| 2,941,606 | Gillette | June 21, 1960 |
| 2,961,054 | Green | Nov. 22, 1960 |